(12) United States Patent
Loiacano

(10) Patent No.: US 11,549,757 B2
(45) Date of Patent: Jan. 10, 2023

(54) AFTERCOOLER DEVICE WITH RIBS FOR ALIGNING COOLING TUBES IN A TWELVE-PASS CONFIGURATION

(71) Applicant: Joseph M. Loiacano, Lockport, NY (US)

(72) Inventor: Joseph M. Loiacano, Lockport, NY (US)

( * ) Notice: Subject to any disclaimer, the term of this patent is extended or adjusted under 35 U.S.C. 154(b) by 107 days.

(21) Appl. No.: 17/129,480

(22) Filed: Dec. 21, 2020

(65) Prior Publication Data
US 2021/0190433 A1 Jun. 24, 2021

Related U.S. Application Data

(63) Continuation-in-part of application No. 16/720,993, filed on Dec. 19, 2019, now abandoned.

(51) Int. Cl.
*F28D 7/16* (2006.01)
*F28F 9/02* (2006.01)
*F28D 1/03* (2006.01)

(52) U.S. Cl.
CPC .................. *F28D 7/16* (2013.01); *F28F 9/02* (2013.01); *F28D 1/0341* (2013.01)

(58) Field of Classification Search
CPC ...... F28D 20/003; F28D 1/0341; F28D 9/005; F28D 13/00; F28D 7/16
See application file for complete search history.

(56) References Cited

U.S. PATENT DOCUMENTS

| | | | | |
|---|---|---|---|---|
| 1,979,975 A | * | 11/1934 | Maniscalco | F28F 9/22 165/172 |
| 3,731,736 A | * | 5/1973 | Fernandes | F28D 9/0081 165/166 |
| 3,907,032 A | * | 9/1975 | DeGroote | F28D 1/05366 165/166 |
| 4,386,652 A | * | 6/1983 | Dragojevic | F28F 9/0224 165/DIG. 507 |
| 5,246,062 A | * | 9/1993 | Meijburg | A23G 3/0226 165/145 |
| 5,575,329 A | | 11/1996 | So | |
| 6,250,379 B1 | * | 6/2001 | Geissler | A61L 2/0023 165/145 |
| 6,314,921 B1 | | 11/2001 | Ash | |

(Continued)

*Primary Examiner* — Paul Alvare
(74) *Attorney, Agent, or Firm* — Vincent G. Lotempio; David T. Stephenson

(57) ABSTRACT

An aftercooler device with ribs for aligning cooling tubes in a twelve-pass configuration provides a heat exchanger that transfers optimal amount of heat from combustion air through use of a tortuous, back-and-forth arrangement of twelve rows of tubes carrying a coolant fluid, and creating agitation therein for efficient cooling. The cooling tubes are organized into separate rows through heat exchanger body. A top cover fastens to the top end of heat exchanger body. The top cover includes six top ribs that segregate cooling tubes into six rows at top end of the heat exchanger. Four of the top ribs are linear, and two of the top ribs have angled configurations. A bottom cover fastens to the bottom end of the heat exchanger. The top cover includes five bottom ribs that segregate the cooling tubes into six rows at bottom end of heat exchanger. The bottom ribs have a linear configuration.

17 Claims, 11 Drawing Sheets

(56) References Cited

U.S. PATENT DOCUMENTS

| | | | |
|---|---|---|---|
| 8,291,892 B2* | 10/2012 | Palanchon | F28D 9/0031 |
| | | | 165/170 |
| 2006/0162917 A1* | 7/2006 | Park | F28F 9/0221 |
| | | | 62/509 |
| 2009/0139474 A1 | 6/2009 | Mokire | |
| 2010/0212876 A1* | 8/2010 | Hancock | F28F 1/32 |
| | | | 165/182 |
| 2016/0160803 A1 | 6/2016 | Gopireddy | |
| 2016/0370126 A1* | 12/2016 | Miller | F28F 9/165 |

* cited by examiner

AFTERCOOLER DEVICE WITH RIBS FOR ALIGNING COOLING TUBES IN A TWELVE-PASS CONFIGURATION

CROSS REFERENCE OF RELATED APPLICATIONS

This application claims the benefits of U.S. Nonprovisional application Ser. No. 16/720,993, filed Dec. 19, 2019 and entitled TWELVE-PASS AFTERCOOLER DEVICE, which is incorporated by reference herein in its entirety.

FIELD OF THE INVENTION

The present invention relates generally to an aftercooler device with ribs for aligning cooling tubes in a twelve-pass configuration. More so, the present invention relates to a twelve-pass aftercooler device that provides a unique heat exchanger body configured to transfer optimal amount of heat energy from the combustion air through use of a tortuous, back-and-forth arrangement of twelve rows of tubes carrying a coolant fluid.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known in the art that a turbocharger integral in an internal combustion engine results in air being compressed prior to entering an engine intake or combustion chamber. Thus, supplying the engine intake with compressed air may allow for more complete combustion. This can result in lower emissions, improved performance, and better engine efficiency. However, compressing the air may also cause an increase in the intake air temperature. Various heat exchangers and aftercoolers can be used to reduce this temperature.

Typically, a heat exchanger, such as an aftercooler provides a mechanical means to remove the heat-of-compression from a compressed air stream, and to condition the air so it can be used in air-operated equipment. Such an aftercooler is necessary because the compressed air discharged from that air compressor is going to be hot. Often, a four-pass heat exchanger is used for this purpose. The four-pass heat exchanger enables combustion air to pass the coolest water at the exit of the heat exchanger, resulting in the most efficient cooling of combustion air.

Other proposals have involved heat exchangers and aftercoolers with multiple cooling tubes. The problem with these heat exchangers and aftercoolers is that they do not utilize twelve bypass tubes to increase the contact with external gases. Also, the prior art does not carry the tubes in a tortuous path to create agitation in the coolant fluid. Even though the above cited heat exchangers and aftercoolers meet some of the needs of the market, a twelve-pass aftercooler device that provides a unique heat exchanger body configured to transfer optimal amount of heat energy from the combustion air through use of a tortuous, back-and-forth arrangement of twelve rows of tubes carrying a coolant fluid, is still desired.

SUMMARY

Illustrative embodiments of the disclosure are generally directed to an aftercooler device with ribs for aligning cooling tubes in a twelve-pass configuration. The aftercooler device provides a unique heat exchanger body configured to transfer optimal amount of heat energy from the combustion air through use of a tortuous, back-and-forth arrangement of twelve rows of cooling tubes carrying a coolant fluid. The cooling tubes are organized into separate rows through use of ribs that align the cooling tubes in the heat exchanger body. The heat exchanger body is sized and dimensioned to maximize the surface area of the wall between the tubes carrying the coolant fluid and the combustion air, while minimizing resistance to fluid flow. The tortuous arrangement of tubes creates turbulence in the coolant fluid for more efficient cooling of the combustion air. The coolant tubes also include fins that increase surface area, for optimal heat transfer. A top cover fastens to the top end of the heat exchanger body. The top cover includes six top ribs that segregate the cooling tubes into six rows at the top end of the heat exchanger body. Four of the top ribs are linear and two of the top ribs are angled. The angled ribs redirect the flow of coolant fluid to a first row of inlet cooling tubes. A bottom cover fastens to the bottom end of the heat exchanger body. The top cover includes five bottom ribs that segregate the cooling tubes into six rows at the bottom end of the heat exchanger body.

In some embodiments, a twelve-pass aftercooler device comprises a heat exchanger body that comprises a top plate located at a top end, and a bottom plate located at a bottom end of the heat exchanger body. The top plate is defined by multiple top tube openings. The bottom plate is also defined by multiple bottom tube openings. In some embodiments, the heat exchanger body further comprises a first sidewall and a second sidewall extending between the top and bottom ends. The first and second sidewalls form a cavity through which the cooling tubes pass.

In another embodiment, twelve-pass aftercooler device comprises a plurality of inlet cooling tubes that are arranged in a tortuous configuration through the cavity of the heat exchanger body. The inlet cooling tubes are also arranged to pass through the top tube openings or the bottom tube openings.

In another embodiment, twelve-pass aftercooler device comprises a plurality of outlet cooling tubes arranged in a tortuous configuration through the cavity of the heat exchanger body. The outlet cooling tubes are also arranged to pass through the top tube openings or the bottom tube openings. In this manner, a coolant fluid flows from the inlet cooling tubes towards the outlet cooling tubes. Further, the tortuous configuration of the cooling tubes is configured to create turbulence in the coolant fluid.

In another embodiment, twelve-pass aftercooler device comprises a top cover that joins with the top plate of the heat exchanger body, the top cover having an outer face and an inner face.

In another embodiment, the outer face of the top cover forms multiple fluid inlet or outlet flange passages. The fluid inlet or outlet flange passages is in fluid communication with the inlet and outlet cooling tubes. The fluid inlet or outlet flange passages are also sized and dimensioned to enable the ingress or the egress of the coolant fluid through the inlet and outlet cooling tubes. Thus, the inlet and outlet cooling tubes can be connected to the passages in any combination or series.

In another embodiment, twelve-pass aftercooler device comprises multiple top ribs that project along the longitudinal of the top cover. The top ribs are operable to redirect the coolant fluid, and to help align the inlet and outlet cooling tubes in multiple, separate rows.

In another embodiment, twelve-pass aftercooler device comprises a bottom cover that joins to the bottom plate of the heat exchanger body. The bottom cover has an outer face and an inner face. In another embodiment, multiple bottom ribs project along the longitudinal of the bottom cover. The bottom ribs are operable to redirect the coolant fluid, and to help align the cooling tubes in multiple rows.

In another aspect, the multiple top ribs comprise six top ribs arranged in a spaced-apart relationship.

In another aspect, four of the top ribs are linear and two of the top ribs are angled.

In another aspect, the multiple bottom ribs comprise five bottom ribs arranged in a spaced-apart relationship.

In another aspect, five of the bottom ribs are linear.

In another aspect, the inlet cooling tubes are arranged in an inlet set of six rows on the top plate and the bottom plate.

In another aspect, the inlet cooling tubes comprise twenty-six inlet cooling tubes arranged in the inlet sets of six rows on the top plate and the bottom plate.

In another aspect, the outlet cooling tubes are arranged in an outlet set of six rows on the top plate and the bottom plate.

In another aspect, the outlet cooling tubes comprise twenty-seven outlet cooling tubes arranged in the outlet sets of six rows on the top plate and the bottom plate.

In another aspect, the coolant fluid entering the fluid inlet or outlet flange passages has a temperature of about 75 degrees Celsius, and the coolant fluid exiting the fluid inlet or outlet flange passages has a temperature greater than 75° Celsius.

In another aspect, the inlet and outlet cooling tubes comprise multiple tube fins. The tube fins are integral with the first and second sidewalls of the heat exchanger body to increase the surface area of the inlet and outlet cooling tubes.

In another aspect, the inlet and outlet cooling tubes are defined by a cylindrical shape and a ⅜" diameter and a cylindrical shape.

In another aspect, the twelve-pass aftercooler device further comprises a fluid circuit operable to regulate flowage of the coolant fluid through the inlet and outlet cooling tubes.

In another aspect, the heat exchanger body comprises a rectangular shape.

In another aspect, the top and bottom covers comprise grey iron castings.

In another aspect, the top cover is bolted to the top end of the heat exchanger body.

In another aspect, the bottom cover is bolted to the bottom end of the heat exchanger body.

In another aspect, the coolant fluid comprises water.

One objective of the present invention is to efficiently cool combustion air from a turbo charger on a diesel engine through use of a twelve-pass aftercooler that allows cooling water to flow in a back-and-forth path through twelve rows of tubes twelve times, so as to cool the combustion air more efficiently.

Yet another objective is to segregate individual rows of cooling tubes with multiple top ribs and/or multiple bottom ribs protruding from their respective covers.

Another objective is to provide a heat exchanger that is operable in the rail, industrial and marine industries.

Yet another objective is to produce a cross flow counter flow design with the tubes, so as to achieve the most efficient heat exchanger, in that it can transfer the most heat energy from the air, per unit mass flow ratio for the water, due to the fact that the average temperature difference along the entire radiator core section is higher.

Additional objectives are to provide tube fins that enhance heat exchange with external gas.

Additional objectives are to present an almost full thermal transfer, water cooled aftercooler that is operable in with engine and compressor mechanisms for rail, industrial, and marine.

Another objective is to provide a flow arrangement that has one fluid circuit extending into twelve tube rows.

An exemplary objective is to provide an inexpensive to manufacture aftercooler.

Another objective is to cool combustion air from the turbo charger on a diesel engine.

Yet another objective is to provide an inexpensive to manufacture twelve-pass aftercooler.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An aftercooler device 100 with ribs for redirecting coolant fluid into appropriate cooling tubes, and for aligning cooling tubes in a twelve-pass configuration, is referenced in FIGS. 1-11. Aftercooler device 100, hereafter "device 100", is a mechanical heat exchanger that utilizes a unique twelve-bypass heat exchange process to optimize heat exchange with ambient air, and more specifically combustible air and hot gases from rail, industrial and marine engines and compressors. The unique twelve-pass configuration of the cooling tubes, and the segregation of the cooling tubes into twelve separate rows through a unique arrangement of ribs, further enhances the heat exchange functionality.

Figure 1:
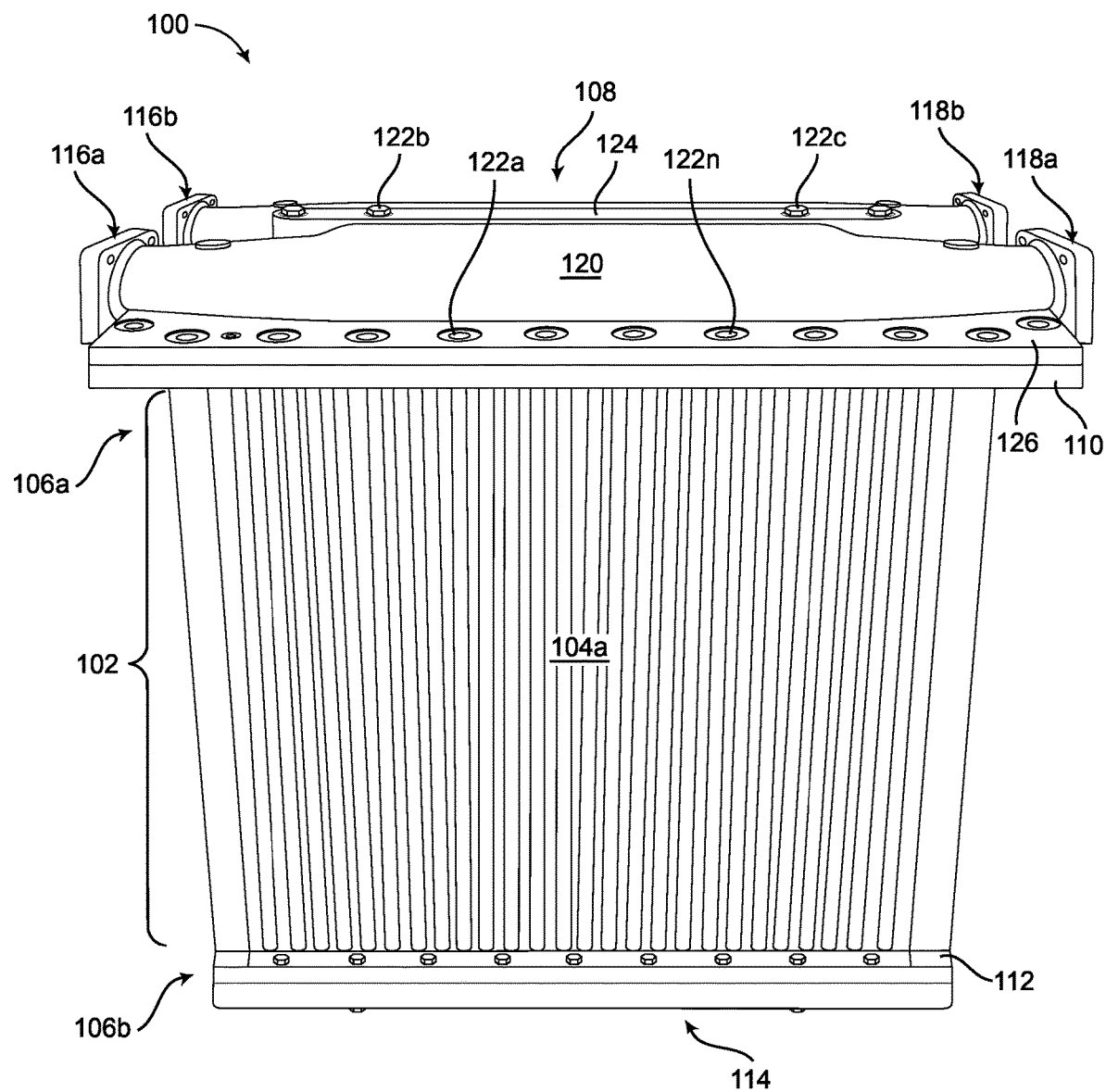
FIG. 1 illustrates a perspective view of an exemplary aftercooler device with ribs for aligning cooling tubes in a twelve-pass configuration, in accordance with an embodiment of the present invention.

As illustrated in FIG. 1, device 100 provides a heat exchanger body 102 configured to transfer optimal amount of heat energy from combustion air through use of a tortuous, back-and-forth arrangement of twelve rows of cooling tubes that carry a coolant fluid through the heat exchanger body 102, while creating agitation therein for efficient cooling of the combustion air. The cooling tubes are organized into separate rows 300a, 300b, passing through the cavity, and top and bottom ends 106a-b, of heat exchanger body 102. Multiple ribs securely retain the cooling tubes in their respective rows, so as to maintain the twelve-pass configuration, and avoid cooling tubes from overlapping each other.

In one embodiment, a top cover 108 fastens to the top end 106a of the heat exchanger body 102, and includes six top ribs 200a-f that segregate the cooling tubes into two sets of rows 300a, 300b, having six cooling tubes 206a-f, 208a-f each, at top end 106a of the heat exchanger body 102. Four of the top ribs 200b-e have a linear configuration, and two of the top ribs 200a, 200f have angled configurations. The angled ribs 200a, 200f redirect the flow of coolant fluid to a first row of inlet cooling tubes. For example, the most outwardly disposed cooling tubes receive the coolant fluid from inlet and outlet cooling tubes 208a.

Top ribs 200a-f are disposed along the longitudinal of the top cover 108. Similarly, a bottom cover 114 fastens to the bottom end 106b of the heat exchanger body 102, and includes five bottom ribs 202a-e that segregate the cooling tubes into two sets of rows 300a, 300b of six cooling tubes each, at the bottom end 106b of heat exchanger. Bottom ribs 202a-e form a linear configuration along the longitudinal of the bottom cover 114.

Figure 2:
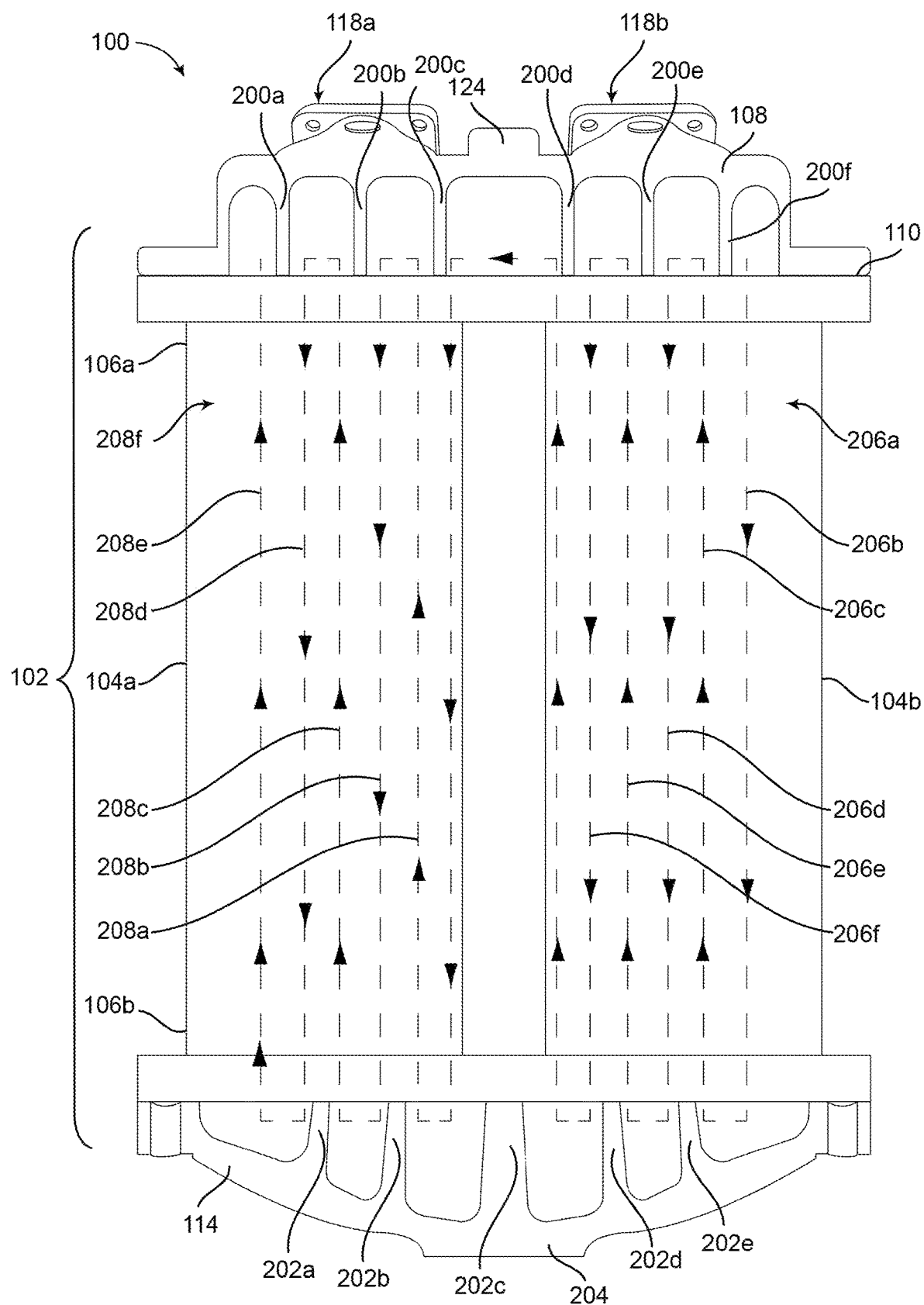
FIG. 2 illustrates a diagram of an exemplary heat exchanger body, showing the flow path of the coolant fluid through the inlet and outlet tubes, showing six inlet cooling tubes carrying coolant fluid into the heat exchanger body, and six outlet cooling tubes carrying coolant fluid from the heat exchanger body, and further showing the top and bottom ribs maintaining the coolant tubes in the twelve-pass arrangement, in accordance with an embodiment of the present invention.
Figure 3:
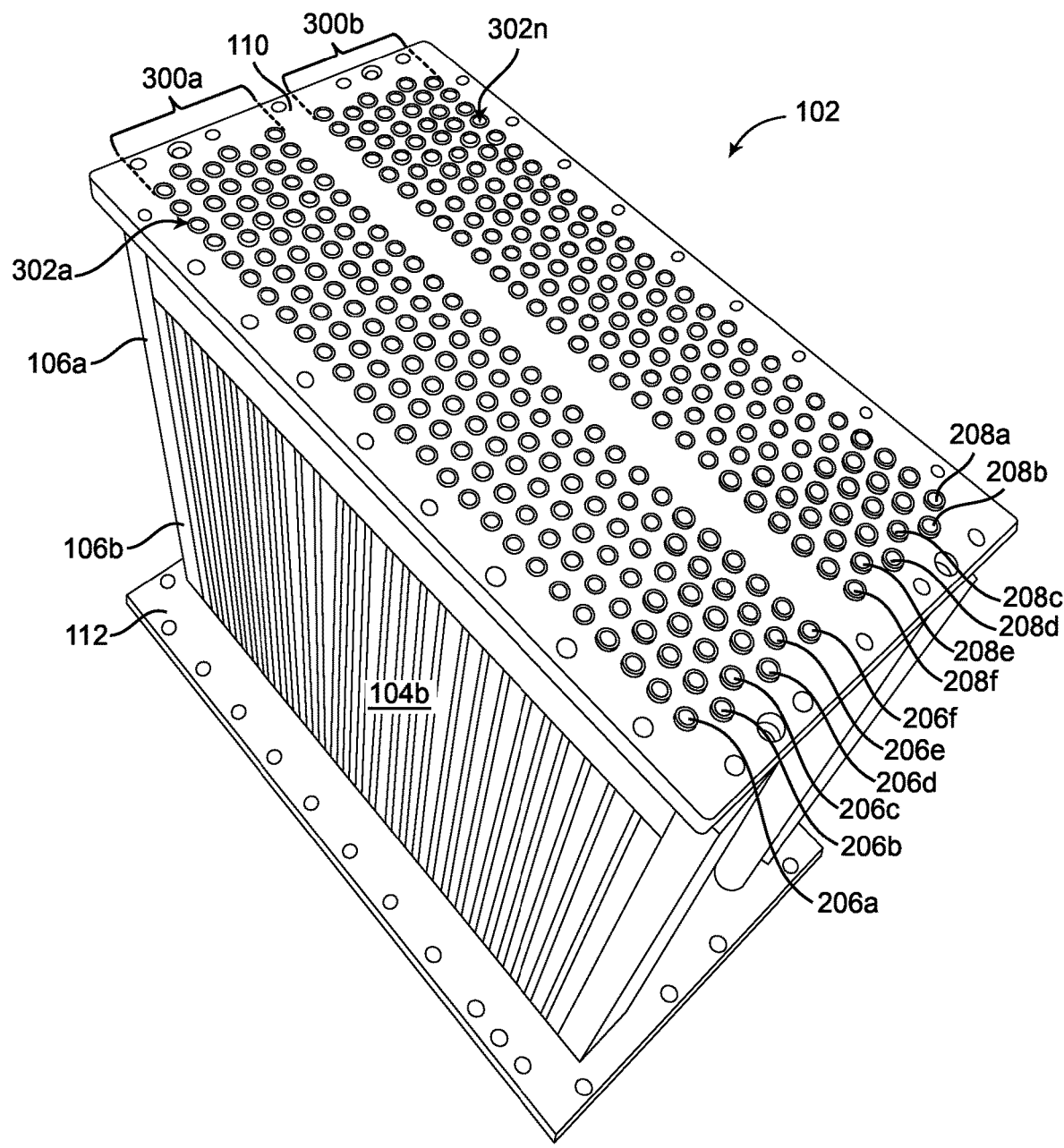
FIG. 3 illustrates a top perspective view of an exemplary heat exchanger body, showing two sets of six rows of top tube openings, in accordance with an embodiment of the present invention.

A diagram of device 100 is referenced in FIG. 2. As illustrated, the flow path of the coolant fluid through the inlet and outlet tubes has six inlet 206a-f cooling tubes carrying coolant fluid into the heat exchanger body, and six outlet cooling tubes 208a-f carrying coolant fluid from the heat exchanger body. Further, top and bottom ribs maintain the coolant tubes in the twelve-pass arrangement. In this manner, heat exchanger body 102 uniquely forms openings at the top and bottom ends 106a-b that enable passage of segregated rows 300a-b of cooling tubes 206a-f, 208a-f to extend through heat exchanger body 102 in a back-and-forth, twelve-pass configuration. Cooling tubes 206a-f, 208a-f have unique structural configurations that increase agitation of the coolant fluid carried within, while also maximizing engagement between the cooling tubes and the surface area of a heat exchanger body 102 through which cooling tubes pass.

Those skilled in the art will recognize that agitating the coolant fluid optimizes the transfer of heat from the external air and combustion air, through the tube walls, and into the coolant fluid. In this case, the cooling tubes follow a tortuous path, and segregate into separate rows 300a-b of cooling tubes to generate turbulence in the coolant fluid, which minimizes the insulative effect of the coolant fluid, such that heat is transferred rapidly. It is also known in the art that carrying the coolant fluid along the longest route inside a heat exchanger maximizes dissipation of heat. In this case, the capacity of the cooling tubes to pass the coolant fluid twelve times through the cooler enhances cooling capacity. In this manner, the twelve-pass configuration of device 100 serves to cool the air and combustible gas to a lower temperature than the existing four pass aftercoolers known in the art.

Looking again at FIG. 2, device 100 comprises of a heat exchanger body 102. Heat exchanger body 102 is sized and dimensioned to contain a twelve-pass configuration of cooling tubes, and provide sufficient surface area and engagement with the cooling tubes such that the heat dissipates more efficiently. Heat exchanger body 102 is defined by a top end 106a and an opposing bottom end 106b. Top end 106a orients above the bottom end 106b, such that coolant fluid flows towards the bottom end 106b. Heat exchanger body 102 comprises a top plate 110 located at top end 106a, and a bottom plate 112 located at bottom end 106b of the heat exchanger body 102.

In one embodiment, top plate 110 is defined by multiple top tube openings through which inlet and outlet cooling tubes 208a-f pass, forming a U-shaped return into the cavity of heat exchanger body 102. In one non-limiting embodiment, two sets of rows 300a-b of top tube openings 302a, 302n form, so as to enable passage of same number of inlet and outlet cooling tubes 206a-f, 208a-f. Similarly, bottom plate 112 is also defined by multiple bottom tube openings 700a, 700n. In one non-limiting embodiment, two sets of rows of bottom tube openings 700a-n form, so as to enable passage of same number of inlet and outlet cooling tubes 206a-f, 208a-f.

In some embodiments, heat exchanger body 102 further comprises a first sidewall 104a and a second sidewall 104b. First and second sidewalls 104a-b are sized and dimensioned to extend between the top and bottom ends 106a-b of heat exchanger body 102. First and second sidewalls form a cavity through which the cooling tubes pass (See FIG. 3). First and second sidewalls 104a-b may also form heat release openings to enable heat to dissipate therefrom; and tube fins that integrate into the sidewalls 104a-b, as described below. In one non-limiting embodiment, heat exchanger body 102 comprises a rectangular shape. However, in other embodiments, square, circular, spherical, and irregular shapes may also be used.

In operation, heat exchanger body 102 is configured to transfer the optimal amount of heat energy from external combustion gases, through use of a tortuous, back-and-forth arrangement of twelve rows of cooling tubes carrying a coolant fluid through the heat exchanger body 102. The tortuous path followed by cooling tubes within heat exchanger body 102 creates turbulence in the coolant fluid for more efficient cooling of combustion air. Heat exchanger body 102 allows for six inlet cooling tubes 206a-f, and six outlet cooling tubes 208a-f arranged in separate sets of rows. This segregated arrangement of inlet and outlet cooling tubes 208a-f serves to maximize contact with surface area of the heat exchanger body 102, while also agitating the coolant fluid and minimizing resistance to fluid flow.

Figure 5:
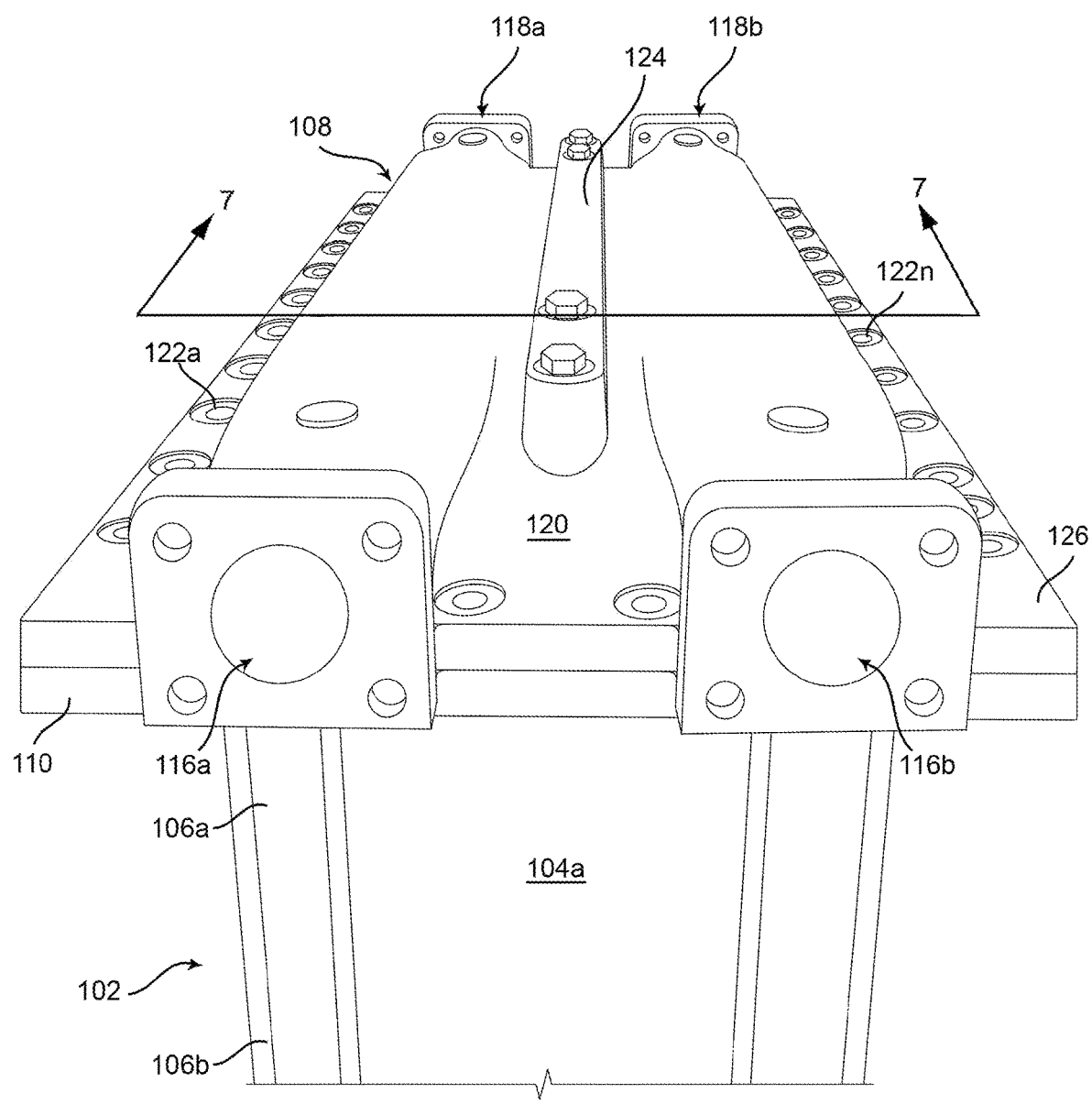
FIG. 5 illustrates a front perspective view of an exemplary top cover bolted to the heat exchanger body, in accordance with an embodiment of the present invention.

As FIG. 5 illustrates, a top cover 108 is utilized to cap the top end 106a of heat exchanger body 102. Top cover 108 is configured to provide structural integrity to heat exchanger body 102, and protect inlet and outlet cooling tubes 208a-f. In some embodiments, top cover 108 comprises an outer face 120 and an opposing inner face 600 that orients towards cavity of heat exchanger body 102. Specifically, inner face 600 of top cover 108 abuts, and lies parallel to top plate 110.

In one non-limiting embodiment, top cover 108 bolts to top plate 110 of heat exchanger body 102. Multiple fastening holes 122a, 122b, 122c, 122n forming along a flange 126 are configured to enable bolts, screws, or other fastening mechanisms to pass through for fastening the top cover 108 to top plate 110. A central dome 124 also provides structural integrity, and an anchoring point to the top plate 110. In another embodiment, top cover 108 is a cast iron material, which is bolted to the top end 106a the heat exchanger body 102.

Figure 6:
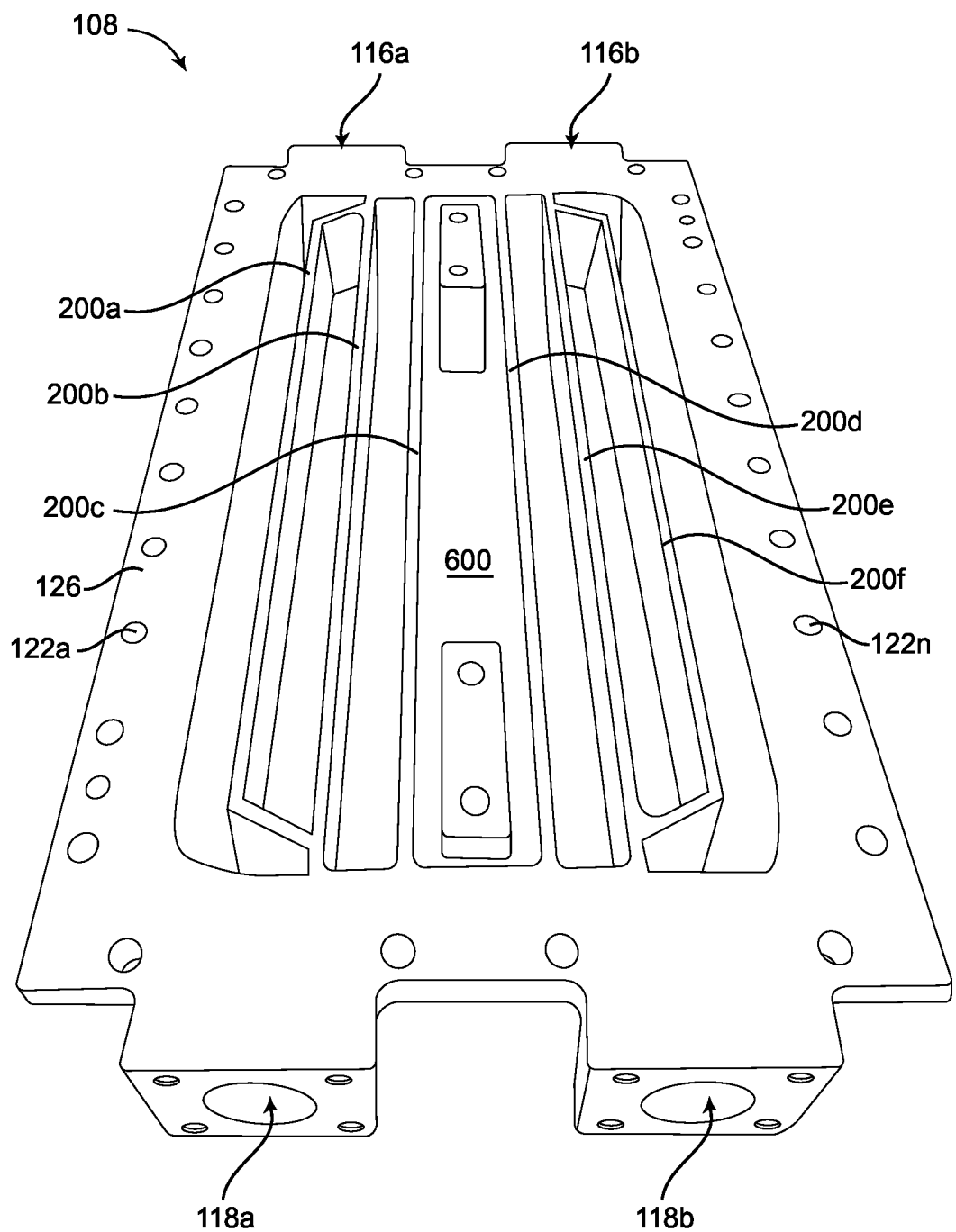
FIG. 6 illustrates a top view of the inner face of the top cover, showing the top ribs extending along the longitudinal of the top cover, in accordance with an embodiment of the present invention.

As FIG. 6 illustrates, top cover 108 is also configured to form passages for ingress and egress of coolant fluid through respective inlet and outlet cooling tubes 208a-f. Thus, outer face of top cover 108 forms multiple fluid inlet or outlet flange passages 116a-b, 118a-b. Fluid inlet or outlet flange passages 116a-b, 118a-b are in fluid communication with the inlet and outlet cooling tubes 208a-f. Through these passages 116a-b, 118a-b, the coolant fluid can enter or exit heat exchanger body 102 through cooling tubes. In one non-limiting embodiment, two fluid inlet or outlet flange passages 116a, 116b are disposed on one end of top cover 108, and two opposing fluid inlet or outlet flange passages 118a, 118b are disposed on the opposite end.

In essence, fluid inlet or outlet flange passages 116a-b, 118a-b are sized and dimensioned to enable the ingress or the egress of the coolant fluid through the inlet and outlet cooling tubes 208a-f. Any combination of ingress and egress of coolant fluid is possible through any of the fluid inlet or outlet flange passages 116a-b, 118a-b. There is no exclusive entry or exit point in the fluid inlet or outlet flange passages. Thus, the inlet and outlet cooling tubes 208a-f can be connected to the passages in any combination or series. In one non-limiting embodiment, two fluid inlet or outlet flange passages 116a-b, 118a-b, and two fluid inlet or outlet flange passages 116a-b, 118a-b form on opposing ends of top cover 108. However, in other embodiments, a greater or lesser number of fluid inlet or outlet flange passages may form in top cover 108.

In one embodiment, the inlet or outlet flange passage 116a introduces the coolant fluid into the heat exchanger, and the inlet or outlet flange passage 118b discharges the coolant fluid from the heat exchanger body through inlet and outlet cooling tubes 208a-f. This presents a diagonal inlet and outlet path for the coolant fluid. Similarly, the inlet or outlet flange passage 118a introduces the coolant fluid into the heat exchanger, and the inlet or outlet flange passage 116b discharges the coolant fluid from the heat exchanger body through inlet and outlet cooling tubes 208a-f. However, any diagonal flow path for the coolant fluid may be utilized by device 100.

In some embodiments, device 100 provides multiple top ribs 200a-f that project along the longitudinal of the top cover 108. Top ribs 200a-f are arranged in unique shapes to redirect coolant fluid into the appropriate row of cooling tubes, and to help align the inlet and outlet cooling tubes 208a-f in multiple, separate rows. For example, FIG. 6 illustrates a perspective view of the top cover 108 fastened to the top plate 110 of the heat exchanger body 102, showing the top cover 108 cut into a cross section to reveal the top ribs 200a-f aligned over the top tube openings.

As illustrated, top cover 108 fastens to the top end 106a of the heat exchanger body 102. Top cover 108 is unique in including six top ribs 200a-f that redirect coolant fluid into the appropriate cooling tubes, and to segregate the cooling tubes into two sets of six rows at top end 106a of the heat exchanger body 102. In one non-limiting embodiment, four of the top ribs 200b, 200c, 200d, 200e have a linear configuration, and two of the top ribs 200a, 200f have angled configurations. The angled ribs 200a, 200f redirect the flow of coolant fluid to a first row of inlet cooling tubes.

For example, the most outwardly disposed cooling tubes receive the coolant fluid from inlet and outlet cooling tubes 208a. The angle includes an acute angle at the termini of the angled ribs 200a, 200f. The angle is also configured so that the end of ribs 200a, 200f forms a junction with the adjacent rib 200b, 200e (See FIG. 6). However, in other embodiments, different numbers and configurations of top ribs may be used.

Figure 7:
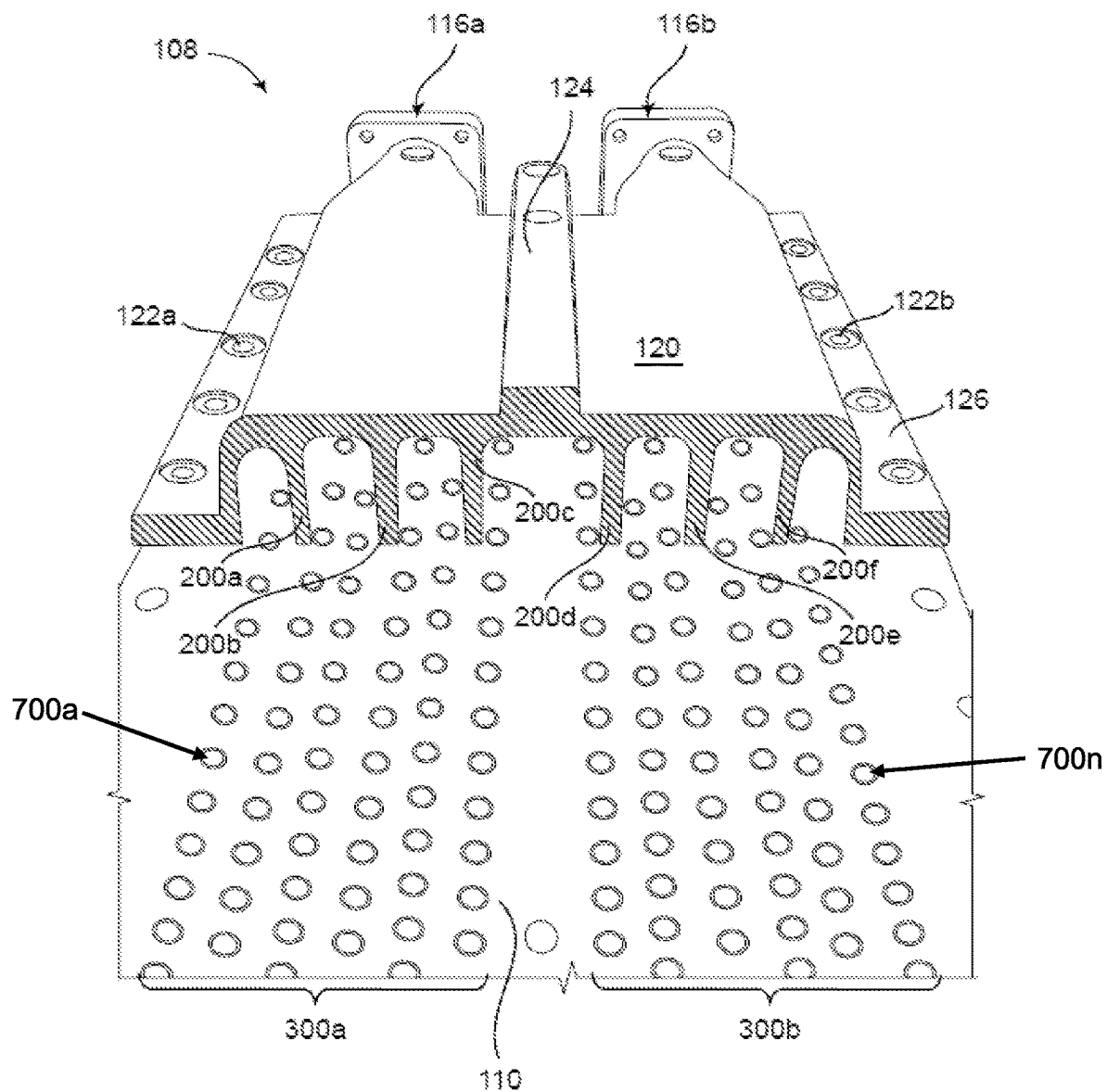
FIG. 7 illustrates a sectioned side view of the top cover fastened to the heat exchanger body, the section of the top cover taken along section 7-7 of FIG. 5, detailing the top ribs projecting from the top cover to segregate the cooling tubes in the twelve-pass arrangement, in accordance with an embodiment of the present invention.

As FIG. 7 has shown, two of the top ribs 200a-f may extend from end to end of bottom cover 114 in a linear path along the longitudinal of the top cover 108; and two more outer top ribs 200a-f form an angle at their ends, and a linear configuration along their middle section. Those skilled in the art will recognize that top ribs 200a-f are effective for minimizing vibrations in heat exchanger body 102 that may dislodge inner and outer cooling tubes from alignment. In one non-limiting embodiment, ribs are metal bars that form a nexus with the inlet and outlet tubes at their respective ends.

Figure 8:
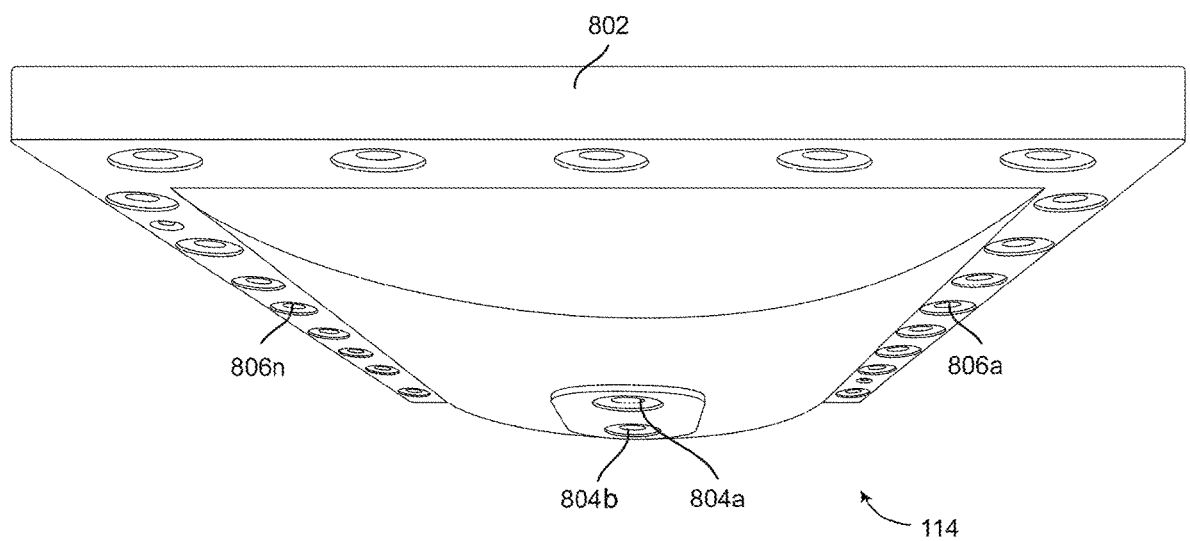
FIG. 8 illustrates a perspective view of an exemplary bottom cover disconnected from the bottom end of heat exchanger body, in accordance with an embodiment of the present invention.

Turning now to FIG. 8, a bottom cover 114 fastens to bottom end 106b of heat exchanger body 102. In some embodiments, bottom cover 114 comprises an outer face 800 and an opposing inner face 900. Bottom cover 114 is configured to provide structural integrity to heat exchanger body 102, and protect inlet and outlet cooling tubes 208a-f. Inner face 900 of bottom cover 114 rests on bottom plate 112 in a parallel arrangement. Bottom cover 114 is bolted to the bottom end 106b of the heat exchanger body 102. In one non-limiting embodiment, bottom cover 114 comprises a cast iron casting. Multiple central fasteners 804a, 804b, and multiple peripheral fasteners 806a, 806n pass through a flange 802, so as to enable bottom cover 114 to bolt, or otherwise fasten to the bottom plate 112.

Figure 9:
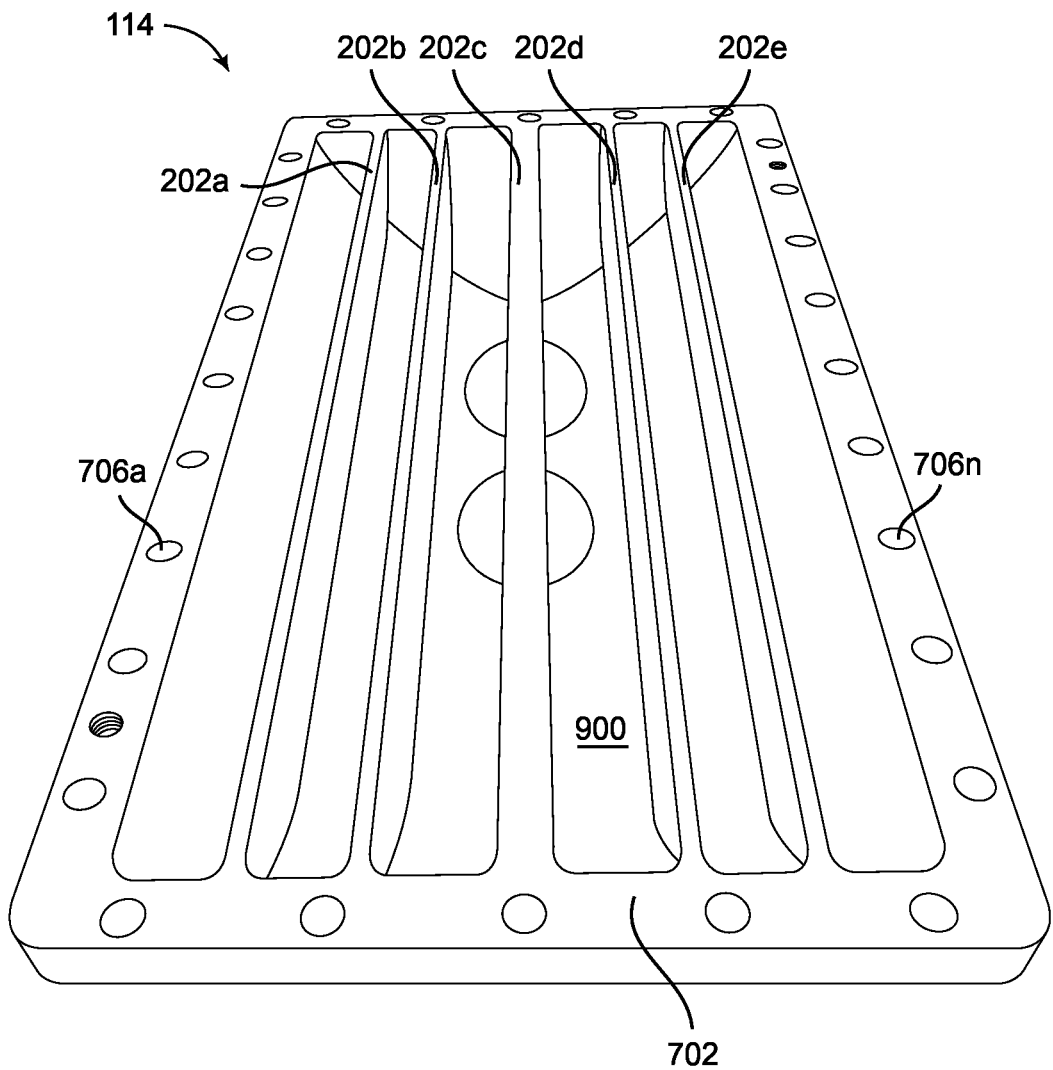
FIG. 9 illustrates multiple bottom ribs project along the longitudinal of bottom cover, in accordance with an embodiment of the present invention.
Figure 10:
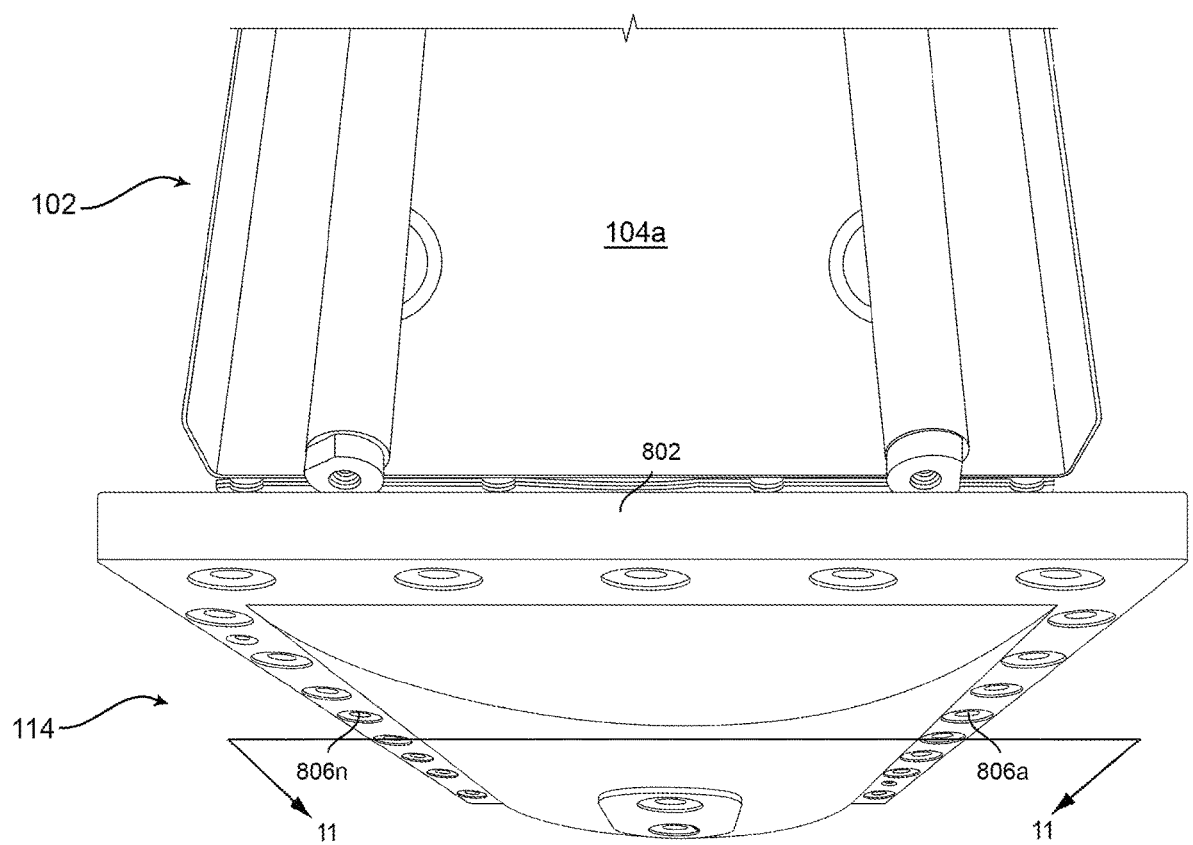
FIG. 10 illustrates a perspective view of the bottom cover fastened to the bottom plate, in accordance with an embodiment of the present invention.

As FIG. 9 shows, multiple bottom ribs 202a-e project along the longitudinal of bottom cover 114. Bottom ribs 202a-e are operable to redirect the coolant fluid, and to help align the cooling tubes in multiple rows. Bottom ribs 202a-e are especially useful when dealing with a vibration that may dislodge cooling tubes from alignment. In one non-limiting embodiment, bottom ribs 202a-e are metal bars that form a nexus with the inlet and outlet tubes at their respective ends. FIG. 10 illustrates a top view of bottom cover 114 aligned with bottom plate 112 for covering bottom end 106b of heat exchanger body 102.

Figure 11:
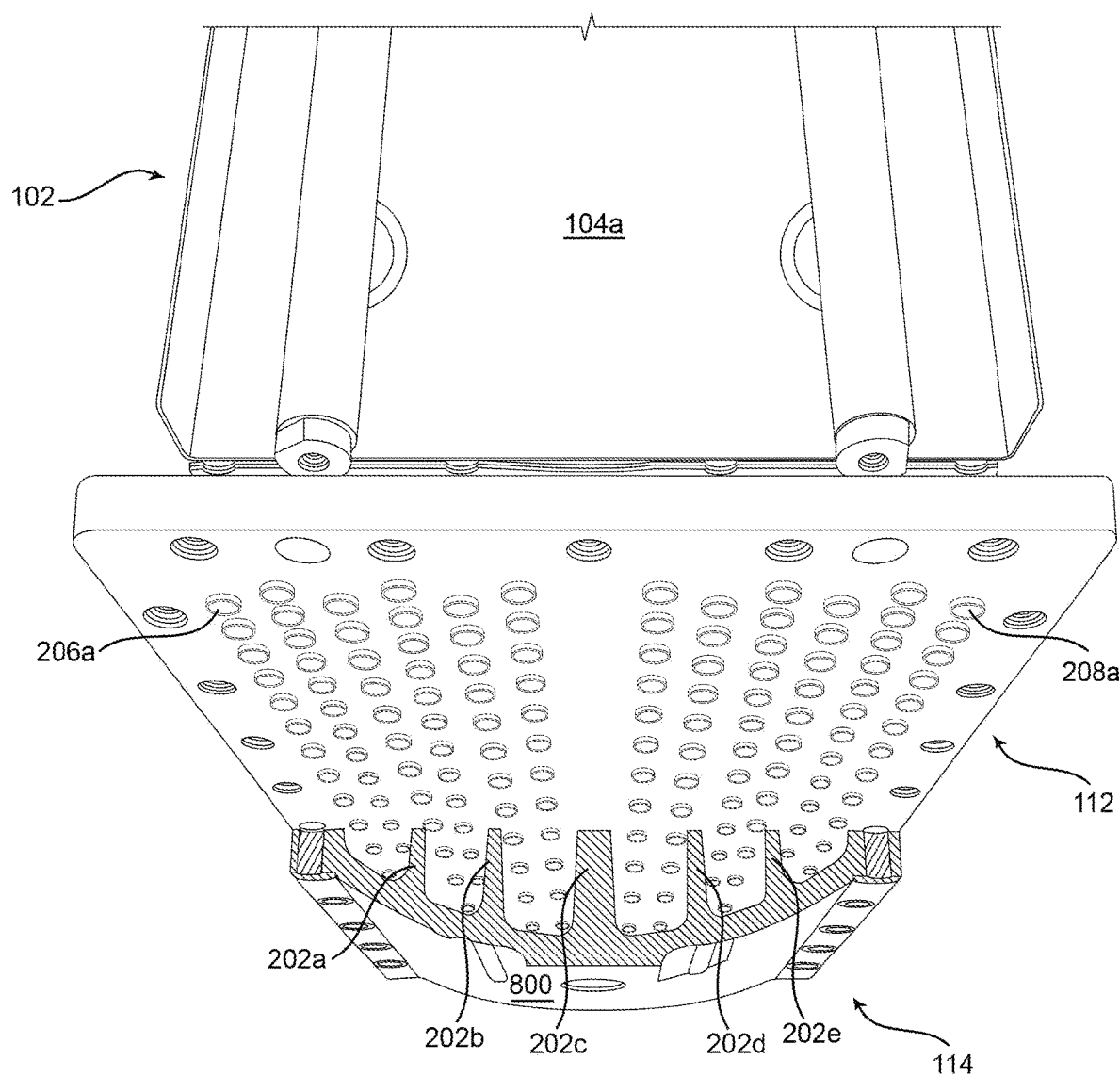
FIG. 11 illustrates a sectioned side view of the bottom cover fastened to the heat exchanger body, the section of the bottom cover taken along section 11-11 of FIG. 10, detailing the bottom ribs projecting from bottom cover to segregate the cooling tubes in the twelve-pass arrangement, in accordance with an embodiment of the present invention.

In one non-limiting embodiment, bottom cover 114 fastens to the bottom end 106b of the heat exchanger body 102, and includes five bottom ribs 202a-e that segregate the cooling tubes into two sets of six rows at the bottom end 106b of heat exchanger. Bottom ribs 202a-e form a linear configuration along the longitudinal of the bottom cover 114. As illustrated in FIG. 11, five parallel bottom ribs 202a, 202b, 202c, 202d, 202e extend from end to end of bottom cover 114. However, in other embodiments, a greater or lesser number of bottom ribs 202a-e may be used to align cooling tubes. Looking again at FIG. 2, device 100 comprises a fluid circuit 204 that is operable to regulate flowage of the coolant fluid through cooling tubes. Fluid circuit 204 provides a regulatory flow arrangement for the tubes by engaging the interior of the twelve rows of tubes. The performance of fluid circuit 204 is compared with a prior art four-pass cross counter flow aftercooler heat exchanger, below.

Looking again at FIG. 2, device 100 provides a plurality of inlet cooling tubes 206a-f that carry the coolant fluid through the heat exchanger body 102. In one embodiment, each row of cooling tubes carries the coolant fluid over the whole face of the heat exchanger body 102. Consequently, the average temperature differential along the entire radiator core section of heat exchanger body 102 is maintained more uniformly. As discussed above, the coolant fluid optimizes the transfer of heat from the external air and combustion air, through the tube walls, before being absorbed into the coolant fluid. As illustrated, inlet cooling tubes 206a-f are arranged in a tortuous configuration through the cavity of the heat exchanger body 102. This serves to dissipate heat from cooling tubes to the heat exchanger body 102 more efficiently.

Inlet cooling tubes 206a-f are also arranged to pass through top tube openings and bottom tube openings in the top and bottom plates 110, 112. In one non-limiting embodiment, the coolant fluid enters inlet passage of top cover 108 at about 75° Celsius. However, the temperature of the coolant fluid may be adjusted and variable depending on variables, such as: the type of coolant fluid, the pressure inside the cooling tubes, and the number of combustible air/gases experiencing heat exchange with the coolant fluid.

In some embodiments, inlet cooling tubes 206a-f comprise twenty-six inlet cooling tubes 206a-f arranged in six rows. However, a greater or lesser number of inlet cooling tubes 206a-f may also be used. In yet other embodiments, inlet cooling tubes 206a-f have a ⅜" diameter. Further, cross section of inlet cooling tubes 206a-f may be defined by a cylindrical shape. However, in other embodiments, cross section of inlet cooling tubes 206a-f may include an elongated rectangular, oval, elliptical, or other unique shape. In some embodiments, inlet cooling tubes 206a-f may be fabricated from a copper, steel, iron, or metal alloy material.

Inlet cooling tubes 206a-f follow a tortuous, back-and-forth pathway between the top and bottom ends 106a-b of the heat exchanger body 102. However, in other embodiments, the tortuous configuration of inlet cooling tubes 206a-f follows a back-and-forth pathway between the first and second sidewalls 104a-b. In either case, the tortuous pathway creates agitation in the coolant fluid as it flows through the cooling tubes. Further, to redirect the coolant fluid, and to help align inlet cooling tubes 206a-f in the twelve-pass configuration, multiple top ribs 200a-f project along the longitudinal of the top cover 108 of heat exchanger body 102.

Working in conjunction with the inlet cooling tubes 206a-f, is a plurality of outlet cooling tubes 208a-f. In one embodiment, inlet and outlet cooling tubes 208a-f are in fluid communication, allowing coolant fluid to flow from inlet cooling tubes 206a-f to outlet cooling tubes 208a-f. Thus, the coolant fluid flows from outside heat exchanger body 102, through inlet passage, through inlet cooling tubes 206a-f, through outlet cooling tubes 208a-f, and finally discharging through outlet passage. Outlet coolant tubes are also arranged in a tortuous configuration through the cavity of the heat exchanger body 102. Further, the tortuous configuration of the cooling tubes is configured to create turbulence in the coolant fluid.

In one embodiment, coolant fluid flows in a closed system returning to inlet cooling tubes 206a-f after discharging through outlet passage. In one non-limiting embodiment, coolant fluid exits outlet passage at a temperature greater than 75° Celsius. The temperature is greater than in the inlet cooling tubes 206a-f because heat has been absorbed while inside heat exchanger body 102. Similar to inlet cooling tubes 206a-f, the outlet cooling tubes 208a-f are arranged in a tortuous configuration through the cavity of the heat exchanger body 102.

In some embodiments, outlet cooling tubes 208a-f comprise twenty-seven outlet cooling tubes 208a-f arranged in six rows. In yet other embodiments, outlet cooling tubes 208a-f have a ⅜" diameter. Further, cross section of outlet cooling tubes 208a-f may be defined by a cylindrical shape. However, in other embodiments, cross section of outlet cooling tubes 208a-f may include an elongated rectangular, oval, elliptical, or other unique shape. In some embodiments, outlet cooling tubes 208a-f may be fabricated from a copper, steel, iron, or metal alloy material.

Figure 4:
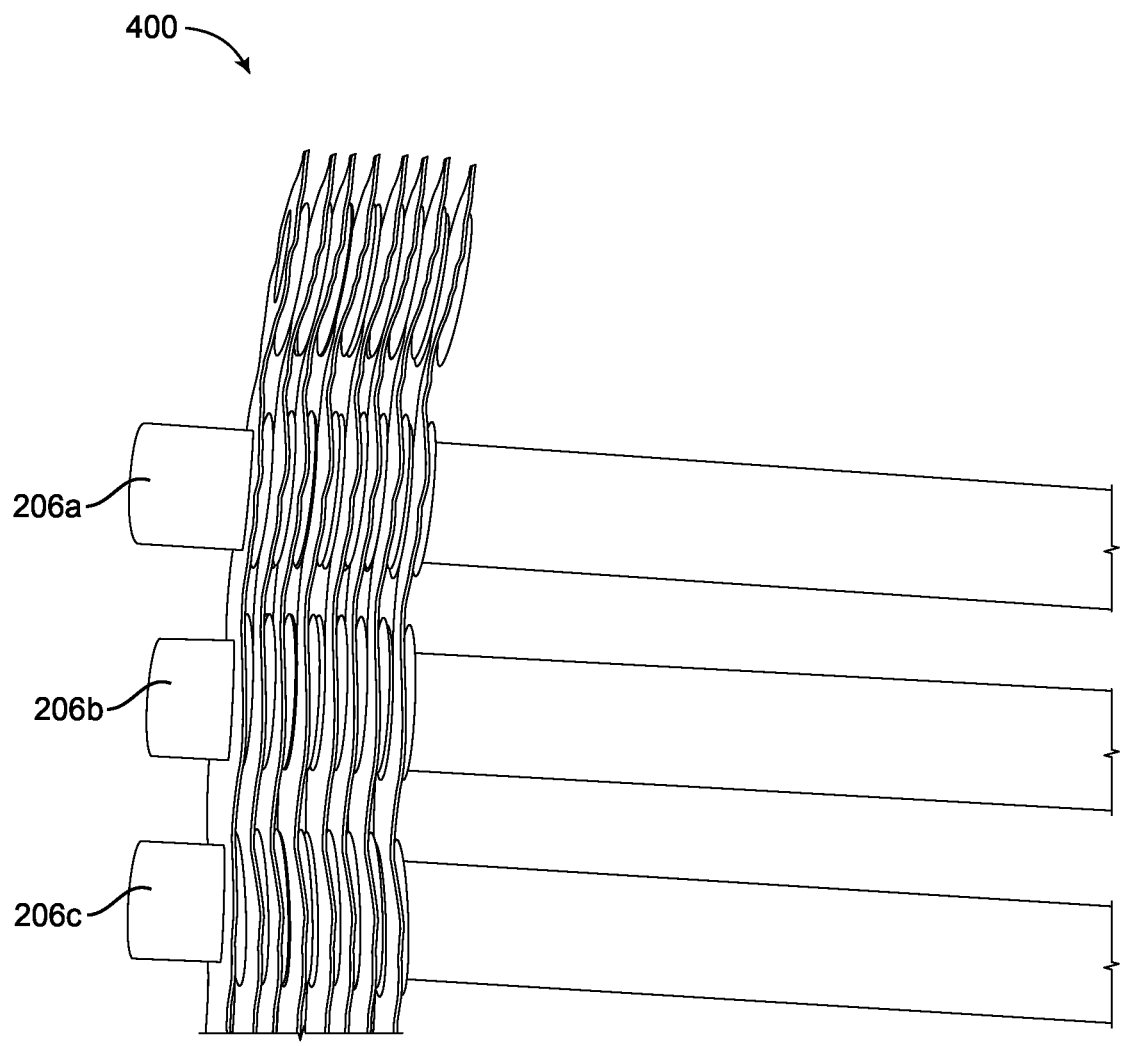
FIG. 4 illustrates an exemplary view of a section of the inlet cooling tube coupled to the tube fins, in accordance with an embodiment of the present invention.

In one embodiment, the inlet and outlet cooling tubes 208a-f form multiple tube fins 400 that are integral with first and second sidewalls 104a-b. FIG. 4 illustrates an exemplary view of a section of the inlet cooling tube coupled to the tube fins 400. As illustrated, only a section of the tube fins 400 are shown coupled to the tube fins; whereby in operation, the entire length of the inlet cooling tube has attached thereto, the tube fins 400. Those skilled in the art will recognize that tube fins 400 are configured to increase surface area for optimal heat transfer with external gas. Such increased surface area helps transfer heat between the coolant fluid and the external gas inside heat exchanger body 102.

Looking at Table 1, shown below, the results of a comparison test between the twelve-pass aftercooler device 100 and a prior art four-pass configuration heat exchanger demonstrate that the thermal effectiveness of the twelve-pass aftercooler device 100 is higher than that of the four-pass heat exchanger. This enhanced thermal efficiency is primarily because of the flow arrangement of separate rows of twelve cooling tubes held in place by top ribs and bottom ribs.

The comparisons between the after coolers, shown in Table 1, are based on the efficiency of heat capacity, including: inlet air temperature, ambient temperature, outlet air temperature, and coolant fluid inlet temperature. The heat capacity values are compared to determine the thermal effectiveness for each type of heat exchanger. Further, the comparison of heat exchangers is based on operation with a 78-L 1-1116 diesel engine. Specifically, the comparison was made with two different diesel engines, demonstrating that, in each engine, the air exiting is closer to the temperature of the cooling water inlet temperature for the twelve-pass aftercooler device 100 than the four-pass after cooler. It is significant to note that, in the present analysis, only temperature differential effects are considered. Pressure drops and other values are not evaluated.

As referenced, the flow arrangement from use of twelve cooling tubes creates a higher thermal effectiveness than that of four cooling tubes, as used in the prior art. Thus, the twelve-pass aftercooler device 100 arrangement upgrades the thermal performance above of the four-pass aftercooler heat exchangers. Specifically, the values in Table 1 show that the discharge temperatures of the coolant fluid and air from twelve-pass aftercooler device 100 are lower and more uniform than those discharged from four-pass aftercooler. For example, the charge air discharge temperature is approximately 4° Celsius cooler from the twelve-pass configuration.

TABLE 1

| ambient temperature 25 degree Celsius | 12-PASS aftercooler | 4-PASS aftercooler |
|---|---|---|
| water inlet temperature, degree Celsius | 75 | 75 |
| charge air temperature in, degree Celsius | 129 | 129 |
| charge air temperature out, degree Celsius | 85 | 89 |
| temperature out, versus water inlet temperature, ΔT degree Celsius | 10 | 14 |
| Relative Efficiency Calculation (B5/C5): | 0.7142857143 | 28.57142857 |

Most prominently, Table 1 illustrates that the air exiting from the twelve-pass aftercooler device 100 is 28.5% closer to the temperature of the cooling water inlet temperature. This is clear evidence that the use of twelve separate cooling tubes arranged in counter flow to each other is more efficient in transferring heat energy from the air, per unit mass flow ratio for the coolant fluid, than the prior art four-pass aftercooler.

The counter flow from the twelve-pass aftercooler device 100 is a result of two sets of inlet and outlet cooling tubes that more efficiently transfer heat energy from the air, per unit mass flow ratio for the water. In such a counter-flow, twelve cooling tubes direct the coolant fluid to travel roughly perpendicular to the air. Consequently, the average temperature differential along the entire radiator core section of heat exchanger body is maintained more uniformly than with the four-pass configurations. Further, each row of twelve cooling tubes makes its own individual thermal history, in comparison to the other rows of cooling tubes in the same aftercooler. As a result, each of the twelve cooling tubes can have a unique heat exchanging capacity.

For efficiency, the twelve-pass aftercooler device 100 is designed to maximize the surface area of the wall between the coolant fluid and the air, while minimizing resistance to fluid flow through the heat exchanger body. For one, the cooling tubes are located in a zigzag arrangement, so as to induce more air turbulence; and thereby produce more efficient cooling. Furthermore, the performance is improved by the addition of tube fins, which increase the surface area.

The twelve-pass aftercooler device 100 is designed according to a uniformity principle. In the uniformity principle, the temperature difference is minimized across the radiator core section of the heat exchanger body. This results in a more uniform temperature distribution over the entire radiator surface area, and higher heat exchanging values. The quantitative measurement of the uniformity principle is shown in Table 1, where temperature is measured at the outlet area of the radiator core section.

Another advantage demonstrated from the comparison test is the use of four fluid inlet or outlet flange passages that allow the coolant fluid to flow in and out of the heat exchanger body through any combination of flange passages. This creates a turbocharger effect, of sorts, which produces more effective cooling of the combustion air that is discharged from the outlet flange passages. Such a four-flange passage layout enables combustion air to pass the coolest water at the exit of the heat exchanger body, resulting in the most efficient cooling of combustion air. Consequently, lower NOX emissions are emitted and improved engine efficiency through lower fuel consumption is produced. This was achieved by, rearranging the connections between the rows of cooling tubes; thereby redistributing the heat transfer area, to sustain highest possible average ΔT, temperature difference.

Another advantage demonstrated in the comparative test is a result of the top and bottom ribs on the respective covers, used to redirect the coolant fluid, and align the cooling tubes in the twelve-pass configuration. In one example, multiple L profile baffles are mounted in the four-outer corners of the top cover, which serves to reduce the bypass air flow. In this manner, the total thermal performance is enhanced, and uncooled air is restricted from passing outside of the aftercooler radiator core section.

Though not shown in this demonstration test, other experimental results for various two-stroke diesel engines, having different number of cylinders, different displacement, different ambient air temperatures, different altitude, and different inlet temperatures; produce similar results. The thermal effectiveness of the twelve-pass aftercooler device 100, and specifically the flow arrangement of the twelve cooling tubes, is higher than that of the four-pass heat exchanger, even when used in two-stroke diesel engines.

Thus, the twelve-pass aftercooler device 100 demonstrates more efficient thermal effectiveness clearly over the whole range of power, versus the four-pass aftercooler heat exchangers. Consequently, is a superior substitute to the prior art aftercoolers; especially in the use of rail, industrial, and marine two stroke prime mover applications. Thus, as the experiment clearly references, twelve-pass aftercooler device 100 provides a more efficient heat exchanger, or as described—Thermal Efficient Heat Exchanger Arrangement.

In conclusion, twelve-pass aftercooler device 100 provides a heat exchanger configured to transfer optimal amount of heat energy from the combustion air through use of a tortuous, back-and-forth arrangement of twelve rows of tubes carrying a coolant fluid, and creating agitation therein for efficient cooling of the combustion air. The cooling tubes are organized into separate rows in the heat exchanger body 102.

Continuing, a top cover 108 fastens to top end 106a of heat exchanger body 102. Top cover 108 includes six top ribs 200a-f that segregate cooling tubes into six rows at top end 106a of the heat exchanger. Four of the top ribs 200a-f have linear configurations along the longitudinal of the bottom cover 114, and two of the top ribs 200a-f have angled configurations. A bottom cover 114 fastens to the bottom end 106b of the heat exchanger. Bottom cover 114 includes five bottom ribs 202a-e arranged in a linear configuration. Bottom ribs 202a-e segregate the cooling tubes into two sets of six rows 300a-b at bottom end 106b of heat exchanger body 102. Bottom ribs 202a-e have a linear configuration along the longitudinal of the bottom cover 114.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A twelve-pass aftercooler device, the device comprising:
    a heat exchanger body comprised of a top plate located at a top end and a bottom plate located at a bottom end, the top plate defined by multiple top tube openings, the bottom plate defined by multiple bottom tube openings, the heat exchanger body further comprising a first sidewall and a second sidewall extending between the top and bottom ends, the first and second sidewalls forming a cavity;
    a plurality of inlet cooling tubes being arranged in a tortuous configuration through the cavity of the heat exchanger body, the inlet cooling tubes further being arranged to pass through the top tube openings or the bottom tube openings;
    a plurality of outlet cooling tubes being arranged in a tortuous configuration through the cavity of the heat exchanger body, the outlet cooling tubes further being arranged to pass through the top tube openings or the bottom tube openings,
    whereby a coolant fluid flows from the inlet cooling tubes towards the outlet cooling tubes,
    whereby, the tortuous configuration of the cooling tubes is configured to create turbulence in the coolant fluid;
    a top cover joined to the top plate of the heat exchanger body, the top cover having an outer face and an inner face,
    the outer face of the top cover forming multiple fluid inlet or outlet flange passages being in fluid communication with the inlet and outlet cooling tubes, the fluid inlet or outlet flange passages enable the ingress or the egress of the coolant fluid through the inlet and outlet cooling tubes;
    six top ribs disposed along the longitudinal of the top cover, the top ribs being operable to redirect the coolant fluid and align the inlet and outlet cooling tubes in multiple rows;
    wherein the six top ribs are arranged in a spaced-apart relationship;
    wherein four of the six top ribs are linear and two of the six top ribs are angled;
    a bottom cover joined to the bottom plate of the heat exchanger body, the bottom cover having an outer face and an inner face; and
    multiple bottom ribs disposed along the longitudinal of the bottom cover, the bottom ribs being operable to help align the cooling tubes in multiple rows.

2. The device of claim 1, wherein the angled ribs comprise two angled ribs that form an angle at the termini and form a junction with an adjacent rib.

3. The device of claim 1, wherein the multiple bottom ribs comprise five linear bottom ribs arranged in a spaced-apart relationship.

4. The device of claim 1, wherein the inlet cooling tubes are arranged in an inlet set of six rows on the top plate and the bottom plate.

5. The device of claim 4, wherein the inlet cooling tubes comprise twenty-six inlet cooling tubes arranged in the inlet sets of six rows on the top plate and the bottom plate.

6. The device of claim 1, wherein the outlet cooling tubes are arranged in an outlet set of six rows on the top plate and the bottom plate.

7. The device of claim 6, wherein the outlet cooling tubes comprise twenty-seven outlet cooling tubes arranged in the outlet sets of six rows on the top plate and the bottom plate.

8. The device of claim 1, wherein the coolant fluid entering the fluid inlet or outlet flange passages has a temperature of about 75 degrees Celsius, and the coolant fluid exiting the fluid inlet or outlet flange passages has a temperature greater than 75° Celsius.

9. The device of claim 1, wherein the inlet and outlet cooling tubes comprise multiple tube fins.

10. The device of claim 9, wherein the first and second sidewalls of the heat exchanger body integral with a tube fin to increase the surface area of the inlet and outlet cooling tubes.

11. The device of claim 1, wherein the inlet and outlet cooling tubes are defined by a cylindrical shape and a ⅜" diameter.

12. The device of claim 1, further comprising a fluid circuit operable to regulate flowage of the coolant fluid through the inlet and outlet cooling tubes.

13. A twelve-pass aftercooler device, the device comprising:
    a heat exchanger body comprised of a top plate located at a top end and a bottom plate located at a bottom end, the top plate defined by multiple top tube openings, the bottom plate defined by multiple bottom tube openings, the heat exchanger body further comprising a first sidewall and a second sidewall extending between the top and bottom ends, the first and second sidewalls forming a cavity;
    a plurality of inlet cooling tubes being arranged in a tortuous configuration through the cavity of the heat exchanger body, the inlet cooling tubes further being arranged to pass through the top tube openings or the bottom tube openings;
    a plurality of outlet cooling tubes being arranged in a tortuous configuration through the cavity of the heat exchanger body, the outlet cooling tubes further being arranged to pass through the top tube openings or the bottom tube openings, whereby a coolant fluid flows from the inlet cooling tubes towards the outlet cooling tubes, whereby, the tortuous configuration of the cooling tubes is configured to create turbulence in the coolant fluid;

a fluid circuit operable to regulate flowage of the coolant fluid through the inlet and outlet cooling tubes;

a top cover joined to the top plate of the heat exchanger body, the top cover having an outer face and an inner face, the outer face of the top cover forming multiple fluid inlet or outlet flange passages being in fluid communication with the inlet and outlet cooling tubes, the fluid inlet or outlet flange passages being sized and dimensioned to enable the ingress or the egress of the coolant fluid through the inlet and outlet cooling tubes;

six top ribs disposed along the longitudinal of the top cover and arranged in a spaced-apart relationship, the top ribs being operable to redirect the coolant fluid and to help align the inlet and outlet cooling tubes in multiple rows;

wherein four of the six top ribs are linear and two of the six top ribs are angled;

a bottom cover joined to the bottom plate of the heat exchanger body, the bottom cover having an outer face and an inner face; and five bottom ribs disposed along the longitudinal of the bottom cover and arranged in a spaced-apart relationship, the bottom ribs being operable to help align the cooling tubes in multiple rows.

14. The device of claim 13, wherein the angled ribs comprise two angled ribs that form an angle at the termini and form a junction with an adjacent rib.

15. The device of claim 13, wherein the inlet cooling tubes comprise twenty-six inlet cooling tubes arranged in two inlet sets of six rows on the top plate and the bottom plate.

16. The device of claim 13, wherein the outlet cooling tubes comprise twenty-seven outlet cooling tubes arranged in two outlet sets of six rows on the top plate and the bottom plate.

17. A twelve-pass aftercooler device, the device comprising:

a heat exchanger body comprised of a top plate located at a top end and a bottom plate located at a bottom end, the top plate defined by multiple top tube openings, the bottom plate defined by multiple bottom tube openings, the heat exchanger body further comprising a first sidewall and a second sidewall extending between the top and bottom ends, the first and second sidewalls forming a cavity;

a plurality of inlet cooling tubes being arranged in a tortuous configuration through the cavity of the heat exchanger body, the inlet cooling tubes further being arranged to pass through the top tube openings or the bottom tube openings;

a plurality of outlet cooling tubes being arranged in a tortuous configuration through the cavity of the heat exchanger body, the outlet cooling tubes further being arranged to pass through the top tube openings or the bottom tube openings, whereby a coolant fluid flows from the inlet cooling tubes towards the outlet cooling tubes, whereby, the tortuous configuration of the cooling tubes is configured to create turbulence in the coolant fluid;

the inlet cooling tubes comprising twenty-six inlet cooling tubes arranged in two inlet sets of six rows on the top plate and the bottom plate;

the outlet cooling tubes comprising twenty-seven outlet cooling tubes arranged in two outlet sets of six rows on the top plate and the bottom plate;

a fluid circuit operable to regulate flowage of the coolant fluid through the inlet and outlet cooling tubes;

a cast iron top cover bolted to the top plate of the heat exchanger body, the top cover having an outer face and an inner face, the outer face of the top cover forming multiple fluid inlet or outlet flange passages being in fluid communication with the inlet and outlet cooling tubes, the fluid inlet or outlet flange passages being sized and dimensioned to enable the ingress or the egress of the coolant fluid through the inlet and outlet cooling tubes;

six top ribs disposed along the longitudinal of the top cover and arranged in a spaced-apart relationship, the top ribs being operable to redirect the coolant fluid and to help align the inlet and outlet cooling tubes in the respective rows, four of the top ribs being linear and two of the top ribs being angled;

a cast iron bottom cover bolted to the bottom plate of the heat exchanger body, the bottom cover having an outer face and an inner face; and five bottom ribs disposed along the longitudinal of the bottom cover and arranged in a spaced-apart relationship, the bottom ribs being operable to help align the inlet and outlet cooling tubes in the respective rows, five of the bottom ribs being linear.

* * * * *